(12) United States Patent
Kimura

(10) Patent No.: US 8,981,619 B2
(45) Date of Patent: Mar. 17, 2015

(54) VIBRATION TYPE ACTUATOR, VIBRATOR, AND VIBRATOR MANUFACTURING METHOD

(75) Inventor: Atsushi Kimura, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 13/078,883

(22) Filed: Apr. 1, 2011

(65) Prior Publication Data

US 2011/0241488 A1    Oct. 6, 2011

(30) Foreign Application Priority Data

Apr. 6, 2010    (JP) ................. 2010-087891

(51) Int. Cl.
*H02N 2/00* (2006.01)
*H02N 2/02* (2006.01)
*H02N 2/16* (2006.01)

(52) U.S. Cl.
CPC ........... *H02N 2/0015* (2013.01); *H02N 2/0065* (2013.01); *H02N 2/026* (2013.01); *H02N 2/163* (2013.01); *H02N 2/22* (2013.01)
USPC ............. 310/323.16; 310/323.09; 310/323.01

(58) Field of Classification Search
CPC ....... H02N 2/163; H02N 2/026; H02N 2/006; H02N 2/103
USPC ............................ 310/323.09, 323.16, 323.01
See application file for complete search history.

(56) References Cited

U.S. PATENT DOCUMENTS

| 6,198,201 | B1 | 3/2001 | Okumura | |
| 7,109,639 | B2 * | 9/2006 | Yamamoto et al. | 310/323.16 |
| 7,466,062 | B2 * | 12/2008 | Sakatani et al. | 310/323.16 |
| 2005/0151442 | A1 * | 7/2005 | Kihara et al. | 310/309 |
| 2006/0220496 | A1 * | 10/2006 | Fujimoto | 310/323.13 |
| 2009/0167111 | A1 * | 7/2009 | Mori | 310/323.16 |
| 2011/0227453 | A1 * | 9/2011 | Araki et al. | 310/323.02 |

FOREIGN PATENT DOCUMENTS

| CN | 1617366 A | 5/2005 |
| CN | 1625046 A | 6/2005 |
| EP | 0696073 A1 | 2/1996 |
| EP | 0923144 A2 | 6/1999 |
| JP | H05-11797 U | 2/1993 |
| JP | H06-24395 U | 3/1994 |

(Continued)

*Primary Examiner* — Derek Rosenau
*Assistant Examiner* — Bryan Gordon
(74) *Attorney, Agent, or Firm* — Canon U.S.A., Inc. IP Division

(57) ABSTRACT

A vibration type actuator providing a satisfactory actuator performance even when an increase in speed is achieved and having a contact spring. The actuator includes a vibrator equipped with an electrical-mechanical energy conversion element, an elastic member to which the electrical-mechanical energy conversion element is fixed, and a protrusion provided on the elastic member. The vibrator can generate an elliptic movement in the protrusion. A driven body is configured to come into contact with the protrusion and to make a relative movement with respect to the vibrator. The protrusion includes a contact portion having a contact surface contacting the driven body, a continuous side wall portion protruding with respect to one end surface of the elastic member and forming a hollow structure, and a connection portion connecting the contact portion and the side wall portion and exhibiting flexibility in a direction normal to the contact surface.

19 Claims, 12 Drawing Sheets

(56) References Cited

FOREIGN PATENT DOCUMENTS

| | | |
|---|---|---|
| JP | H11-346487 A | 12/1999 |
| JP | 2006-174549 A | 6/2006 |
| JP | 2006-311790 A | 11/2006 |
| JP | 2008-125147 A | 5/2008 |
| WO | 2008056528 A1 | 5/2008 |

* cited by examiner

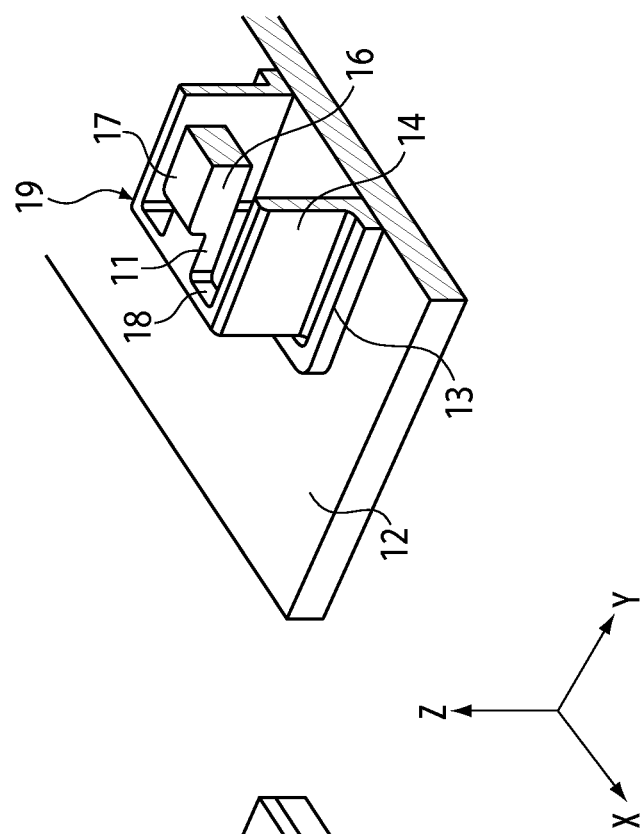
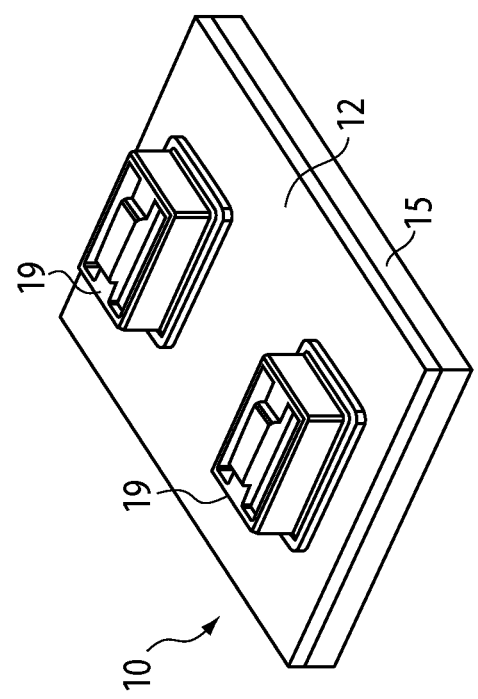

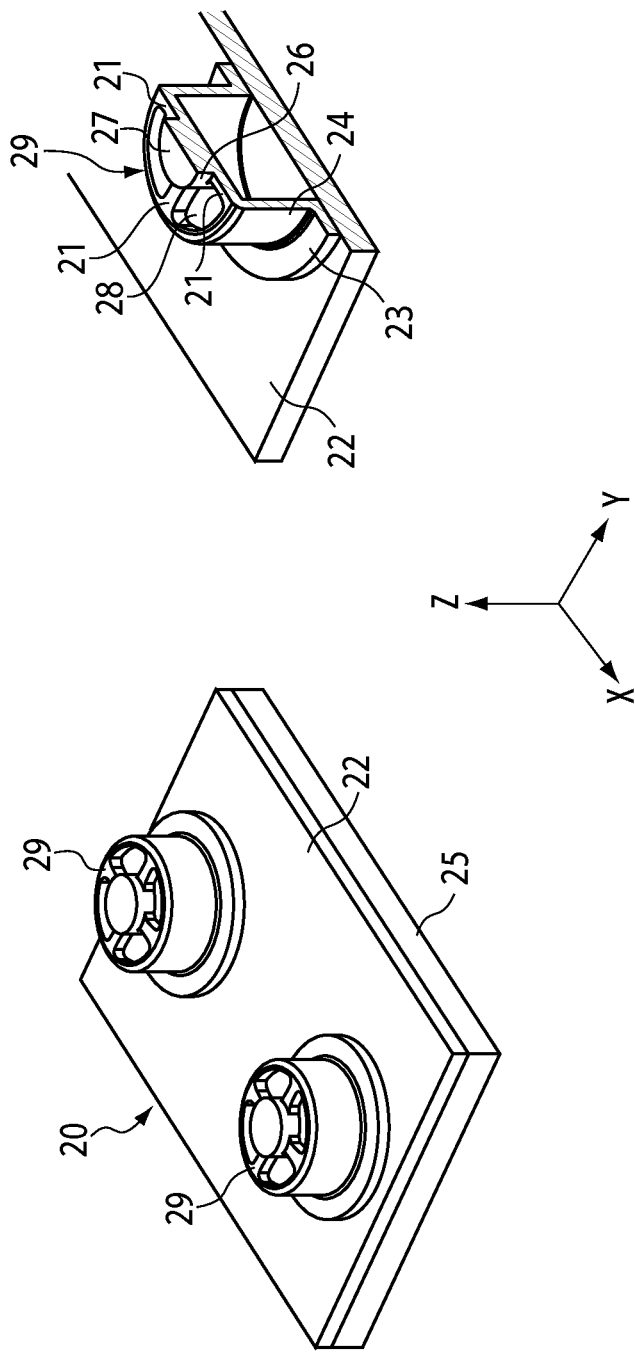

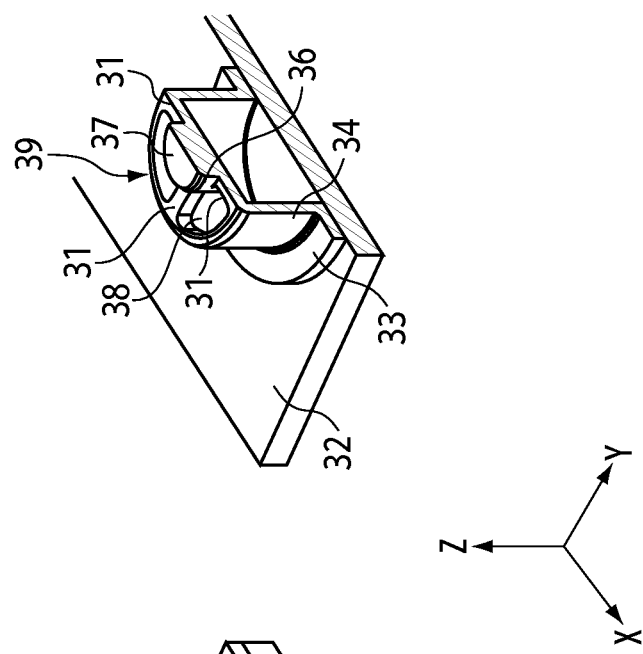
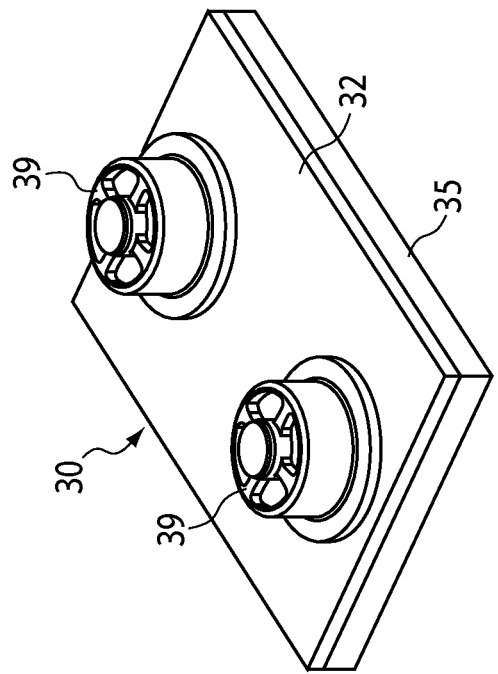

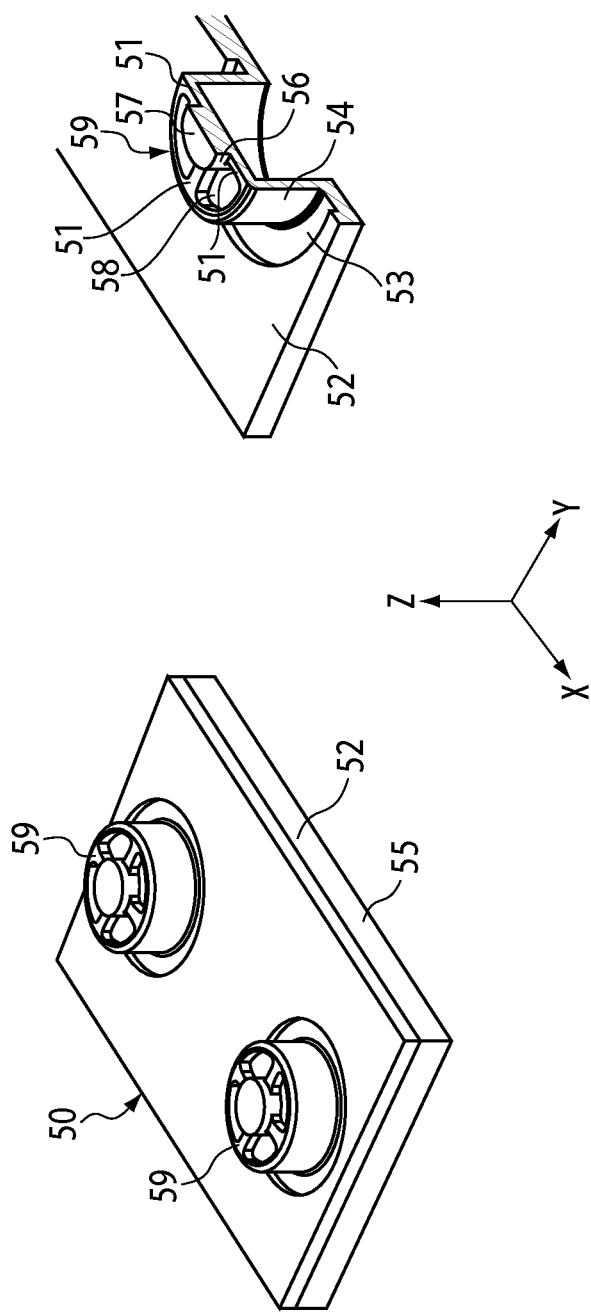

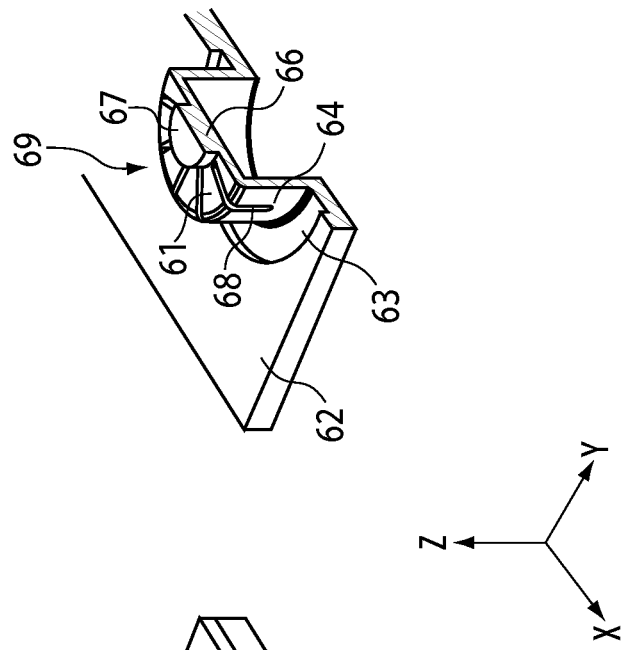
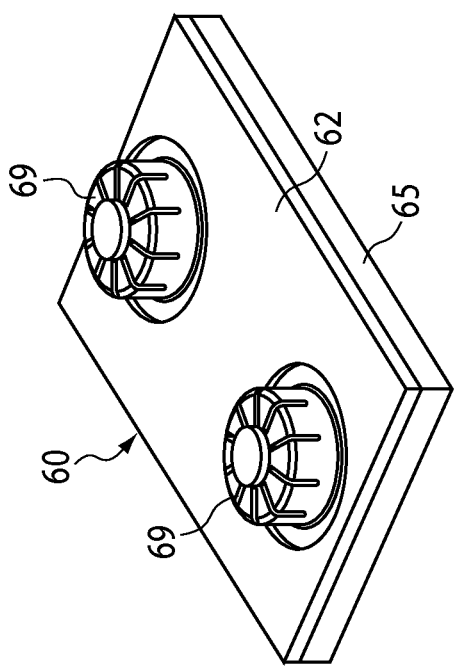
FIG. 7B
FIG. 7A

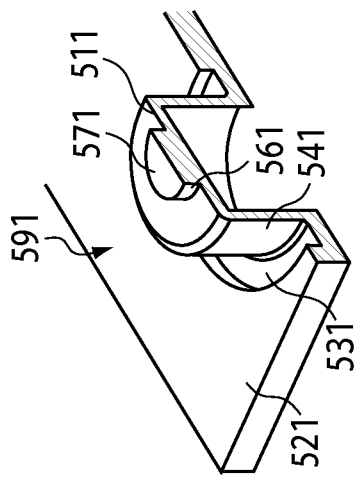
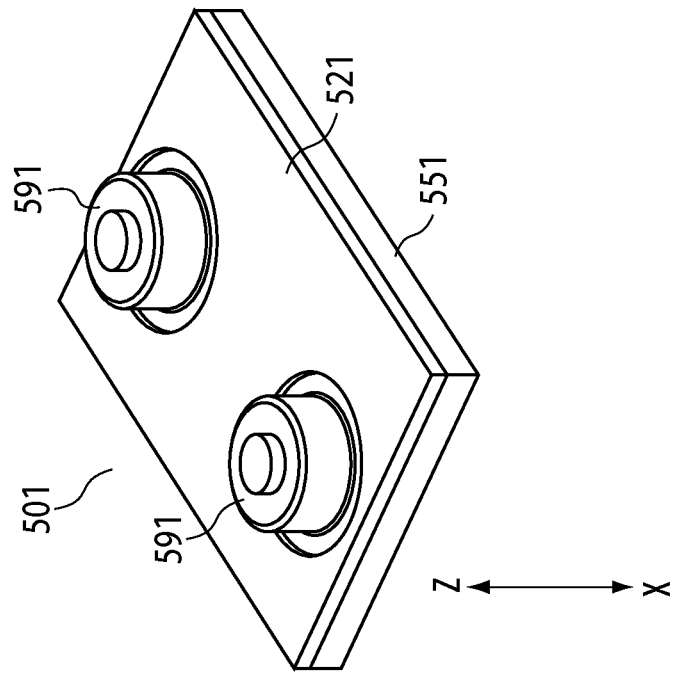

VIBRATION TYPE ACTUATOR, VIBRATOR, AND VIBRATOR MANUFACTURING METHOD

BACKGROUND OF THE INVENTION

1. Field of the Invention

The present invention relates to a vibration type actuator generating vibration in a vibrator to cause a driven body to make a relative movement, a vibrator of a vibration type actuator, and a vibrator manufacturing method.

2. Description of the Related Art

In a vibration type actuator, a contact portion to be brought into press contact is endowed with resiliency, whereby a smooth contact can be realized, and a satisfactory performance can be obtained. As illustrated in FIG. 11, in a linear vibration type actuator discussed in Japanese Patent Application Laid-Open No. 2008-125147, a vibrator 110 is provided with protrusions 119 each equipped with a contact portion 113 exhibiting resiliency.

The protrusion 119 is composed of the contact portion 113 having a contact surface 114 to be brought into contact with a driven body (not illustrated), a fixation portion 117, and a connection portion 116 connecting the contact portion 113 and the fixation portion 117, and the fixation portion 117 is fixed to an elastic member 112 by laser welding or the like. In order that the contact portion 113 may exhibit resiliency, the elastic member 112 is provided with a groove portion 118 of a sufficient depth. The elastic member 112 is provided on a piezoelectric member 115.

The provision of a vibrator with a contact portion with resiliency is not limited to a linear vibration type actuator. As discussed in Japanese Patent Application Laid-Open No. 2006-311790, there exists a rotary vibration type actuator for generating a progressive wave in an elastic member whose vibrator has at the distal end of a protrusion thereof a resilient contact portion joined thereto.

However, the conventional constructions described above have the following problems. In the linear vibration type actuator discussed in Japanese Patent Application Laid-Open No. 2008-125147, to increase the moving speed of the driven body, it is necessary to heighten the contact surfaces 114 of the vibrator 110, which are brought into contact with the driven body, to thereby enlarge the vibration amplitude in the feeding direction (the X-direction).

However, heightening the contact surface 114 results in a reduction in the rigidity in the X-direction of the connection portions 116, so that, although high vibration speed can be attained, it is difficult to transmit drive force efficiently to the driven body. Further, since the resonance frequency of the vibration mode in which the protrusions 119 vibrate is reduced, unnecessary vibration is likely to be generated, so that, in some cases, it is difficult to obtain a satisfactory actuator performance.

Also regarding the rotary vibration type actuator as discussed in Japanese Patent Application Laid-Open No. 2006-311790, heightening the contact surfaces results in a reduction of the rigidity in the peripheral and radial directions, and unnecessary vibration may easily occur.

SUMMARY OF THE INVENTION

According to an aspect of the present invention, a vibration type actuator includes a vibrator equipped with an electrical-mechanical energy conversion element, an elastic member to which the electrical-mechanical energy conversion element is fixed, and a protrusion provided on the elastic member, and the vibrator being configured to generate an elliptic movement in the protrusion, and a driven body configured to contact with the protrusion and to move relatively to the vibrator, wherein the protrusion includes a contact portion having a contact surface contacting the driven body, a continuous side wall portion protruding with respect to one end surface of the elastic member and forming a hollow structure, and a connection portion connecting the contact portion and the side wall portion and exhibiting flexibility in a direction normal to the contact surface.

According to another aspect of the present invention, a vibrator includes an electrical-mechanical energy conversion element, an elastic member to which the electrical-mechanical energy conversion element is fixed, and a protrusion provided on the elastic member, is the vibrator being configured to generate an elliptic movement in the protrusion to thereby cause a driven body to make a relative movement, wherein the protrusion includes a contact portion having a contact surface contacting the driven body, a continuous side wall portion protruding with respect to one end surface of the elastic member and forming a hollow structure, and a connection portion connecting the contact portion and the side wall portion and exhibiting flexibility in a direction normal to the contact surface.

According to yet another aspect of the present invention, a method of manufacturing a vibrator equipped with an electrical-mechanical energy conversion element, an elastic member to which the electrical-mechanical energy conversion element is fixed, and a protrusion provided on the elastic member, and the vibrator being configured to cause a driven body contacting the protrusion to make a relative movement, includes performing press molding on the elastic member to thereby form a continuous side wall portion protruding from the elastic member and forming a hollow structure, a contact portion having a contact surface configured to contact the driven body, and a connection portion configured to connect the side wall portion and the contact portion and have flexibility in a direction normal to the contact surface, and punching the elastic member to shape the vibrator.

According to the present invention, the side surface of the protrusion is continuously connected with the contact surface of the protrusion of the vibration type actuator while exhibiting resiliency in the Z-direction, so that it is possible to ensure rigidity in the X- and Y-directions, thereby making it possible to obtain a satisfactory actuator performance.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1A is a perspective view of a vibrator according to a first exemplary embodiment of the present invention, and FIG. 1B is a perspective view, partly in section, of a protrusion thereof.

FIG. 2A is a perspective view of a vibrator according to a second exemplary embodiment of the present invention, and FIG. 2B is a perspective view, partly in section, of a protrusion thereof.

FIG. 3A is a perspective view of a vibrator according to a third exemplary embodiment of the present invention, and FIG. 3B is a perspective view, partly in section, of a protrusion thereof.

FIG. 5A is a perspective view of a vibrator according to a fifth exemplary embodiment of the present invention, and FIG. 5B is a perspective view, partly in section, of a protrusion thereof.

FIG. 7A is a perspective view of a vibrator according to a sixth exemplary embodiment of the present invention, and FIG. 7B is a perspective view, partly in section, of a protrusion thereof.

FIG. 12A is a perspective view of a vibrator according to a modification example of the fifth exemplary embodiment of the present invention, and FIG. 12B is a perspective view, partly in section, of a protrusion thereof.

DESCRIPTION OF THE EMBODIMENTS

Various exemplary embodiments, features, and aspects of the invention will be described in detail below with reference to the drawings.

In a first exemplary embodiment, a vibrator applicable to a linear vibration type actuator will be described. First, the driving principle thereof will be described with reference to FIGS. 9, 10A, and 10B.

Figure 9:
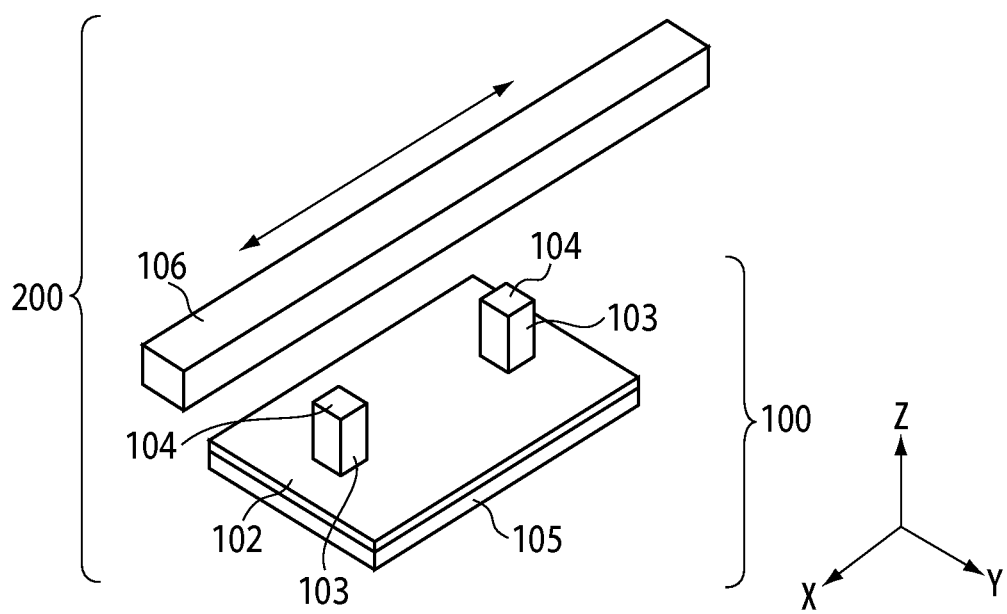
FIG. 9 is an external perspective view of a conventional linear vibration type actuator.

FIG. 9 is a schematic perspective view of a linear vibration type actuator. In FIG. 9, a linear vibration type actuator 200 is composed of a vibrator 100 and a slider 106 constituting a driven body. The vibrator 100 has a piezoelectric element 105, which is an electrical-mechanical energy conversion element formed as a rectangular thin plate, an elastic member 102 joined to one end surface of the piezoelectric element 105, and two protrusions 103 formed so as to protrude from the elastic member 102.

Figure 10:
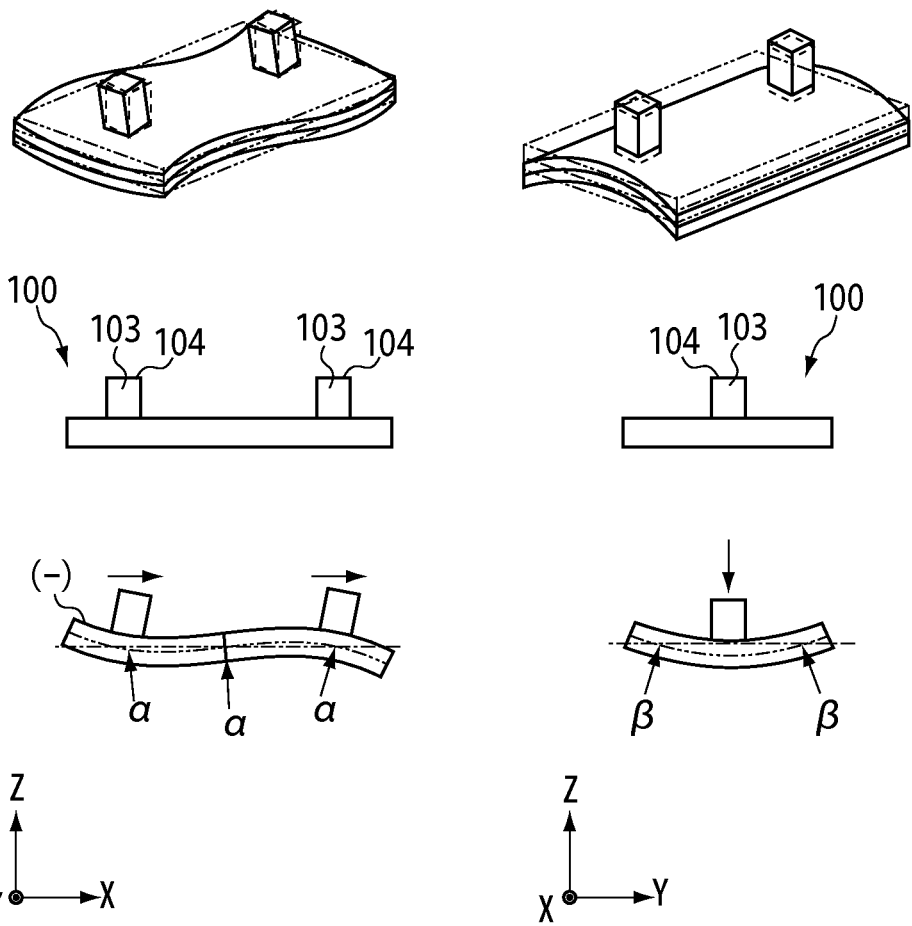
FIGS. 10A and 10B are diagrams illustrating two vibration modes in which excitation is effected by the vibrator of FIG. 9.
Figure 11:
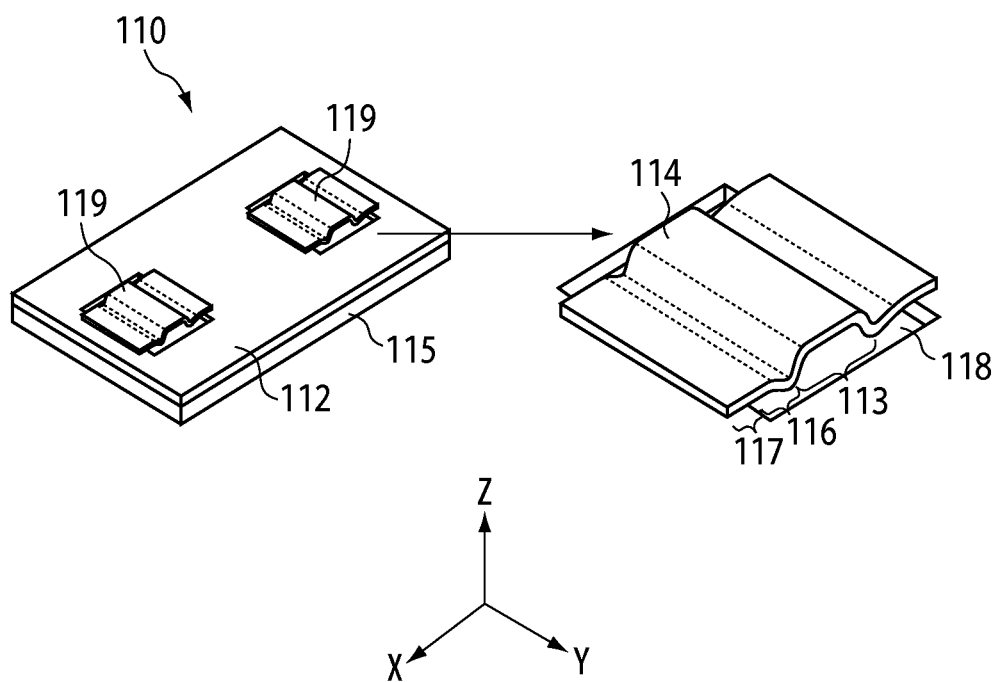
FIG. 11 is a perspective view of a vibrator on which protrusions with resiliency are mounted, and of one of the protrusions.

FIGS. 10A and 10B are diagrams illustrating how the vibrator illustrated in FIG. 9 is deformed through excitation in two vibration modes (MODE-A and MODE-B), respectively. Here, both of the two vibration modes are bending vibration modes in out-of-plane directions with respect to the vibrator 100. The configuration of the vibrator 100 is selected so that the resonance frequencies substantially coincide with each other.

The two diagrams located downside in FIG. 10A illustrate the vibrator 100 as seen from the Y-direction. As illustrated in the diagram at the bottom of FIG. 10A, the vibration of MODE-A is a vibration of a secondary bending vibration mode in which there appear three nodes (α), which extend in the Y-direction of the vibrator 100.

The protrusions 103 are arranged at positions in the vicinity of the nodes in the vibration of MODE-A, and in the vibration of MODE-A, there is generated in them a reciprocating movement causing the contact surfaces to be displaced in the X-direction (a direction which is parallel to the contact surfaces and which constitutes the driven body feeding direction) as indicated by the arrows.

The two diagrams located downside in FIG. 10B illustrate the vibrator 100 as seen from the X-direction. As illustrated in the diagram at the bottom of FIG. 10B, the vibration of MODE-B is a vibration of a primary bending vibration mode in which there appear two vibration nodes (β), which extend in the X-direction of the vibrator 100. That is, the vibration nodes of MODE-A and the vibration nodes of MODE-B are orthogonal to each other in an XY-plane.

As illustrated in FIG. 10B, the protrusions 103 are situated in the vicinity of positions constituting the antinodes in the vibration of MODE-B, and through the vibration of MODE-B, there is generated in the protrusions 103 a reciprocating movement causing the contact surfaces to be displaced in the Z-direction (a direction which is perpendicular to the contact surfaces and which is a push-up direction) as indicated by the arrow.

When AC signals differing in time phase by approximately π/2 are input to two electrodes (not illustrated) provided in the piezoelectric element 105, vibrations of MODE-A and MODE-B described above are generated through excitation in the vibrator 100 in such a manner that the difference in time phase is approximately ±π/2. The vibrations of the two vibration modes are synthesized, whereby an elliptic movement in the XZ-plane in FIG. 9 is generated in the contact surfaces 104 of the protrusions 103. Due to this elliptic movement, the slider 106, which is brought into press contact with the contact surfaces 104, makes a relative movement with respect to the vibrator 100.

It should be noted, however, that, in the linear vibration type actuator of the present exemplary embodiment, the method of generating an elliptic movement in the contact surfaces is not limited to the above-described one. For example, it is also possible to combine with each other vibrations of vibration modes different from the above-described ones, or to combine with each other a vibration of a vertical vibration mode expanding and contracting the elastic member in the X-direction and a vibration of a bending vibration mode.

In other words, it is possible to adopt any type of drive system so long as it is one generating an elliptic movement in the contact surfaces through combination of a vibration substantially of a vibration mode for displacing the contact surfaces in the feeding direction and a vibration in a vibration mode for displacing the contact surfaces in the pushing-up direction.

Next, a specific construction of the vibrator of the first exemplary embodiment will be described. FIG. 1A is a perspective view of a vibrator to which the first exemplary embodiment of the present invention is applicable, and FIG. 1B is a perspective view, partly in section, of a protrusion thereof. The actuator of the present exemplary embodiment is a linear vibration type actuator. As its driving principle, the drive system of the conventional linear vibration type actuator described above is applicable.

As illustrated in FIG. 1A, a vibrator 10 has a piezoelectric element 15 formed as a rectangular thin plate, an elastic member 12 fixed to the piezoelectric element 15, and two protrusions 19 protruding from one end surface of the elastic member 12 (e.g., from the surface on the opposite side of the surface to which the piezoelectric element 15 is bonded). In the present exemplary embodiment, it is possible to provide only one protrusion or a plurality of protrusions as in the present exemplary embodiment. Further, the protrusions 19 may be provided on the surface on the side to which the piezoelectric element 15 is joined.

As illustrated in FIG. 1B, each protrusion 19 has a rectangular side wall portion 14 of a hollow structure protruding with respect to the elastic member 12, a contact portion 16 having a contact surface 17 to be brought into contact with a slider (the driven body) (not illustrated), and a connection portion 11 connecting the side wall portion 14 and the contact portion 16. As in the present exemplary embodiment, in the case where the protrusions 19 are fixed to the elastic member 12, there is provided a fixation portion 13 joined to the upper surface of the elastic member 12 by laser welding or the like.

The side wall portion 14 is continuous (i.e., continuous in a tubular fashion over the entire periphery of the protrusion 19), so that a predetermined rigidity in the in-XY-plane direction is secured for the protrusion 19. A step is provided between the connection portion 11 and the contact portion 16, with the upper surface of the connection portion 11 being lower than the contact surface 17 of the contact portion 16. That is, the contact surface 17 protrudes farther toward the driven body side (the side opposite to the elastic member side) than the driven body side surface (the surface on the side opposite to the elastic member side) of the connection portion 11.

With this structure, the slider does not come into contact with the connection portion 11. Further, the connection portion 11 is thinner than the contact portion 16, and, in addition, the width of the connection portion 11 is reduced through division into two by hole portions 18, so that it is reduced in rigidity in the Z-direction and is endowed with resiliency (flexibility). In the case where a predetermined level of resiliency can be obtained solely through a reduction in its thickness, there is no need to divide the connection portion 11 into a plurality of parts by the hole portions 18.

Due to the above construction, the protrusion 19 has resiliency in the Z-direction (the direction of the normal to the contact surface), so that it is possible to realize a smooth contact between the vibrator 10 and the slider. Further, even if the height of the protrusion 19 is increased for higher speed, the requisite rigidity is secured for the protrusion 19 in the X-direction, which is the driving direction of the slider, due to the continuous side wall portion 14 in its periphery, so that it is possible to transmit the drive force of the vibrator 10 efficiently to the slider.

Further, the protrusion 19 has at its distal end a portion having resiliency, so that the resonance frequency of the vibration mode thereof is sufficiently higher than the drive frequency of the vibrator 10, making it possible to obtain a satisfactory actuator performance.

A vibrator according to a second exemplary embodiment differs from that of the first exemplary embodiment in that the protrusions are of a cylindrical configuration. FIG. 2A is a perspective view of a vibrator to which the second exemplary embodiment of the present invention is applicable, and FIG. 2B is a perspective view, partly in section, of a protrusion of the vibrator. The present exemplary embodiment is also applied to a linear vibration type actuator, and its driving principle is the same as that of the conventional linear vibration type actuator, so that the description thereof will be omitted.

As illustrated in FIG. 2A, a vibrator 20 has a piezoelectric element 25, an elastic member 22 fixed to the piezoelectric element 25, and two protrusions 29 protruding from one end surface of the elastic member 22. As illustrated in FIG. 2B, each protrusion 29 has a cylindrical side wall portion 24 provided so as to protrude from the elastic member 22, a contact portion 26 having a contact surface 27 to be brought into contact with a slider (not illustrated), and connection portions 21 connecting the side wall portion 24 and the contact portion 26.

The side wall portion 24 is fixed to the elastic member 22 by laser welding or the like through the intermediation of a fixation portion 23. Since the side wall portion 24 is continuous over the entire periphery of the protrusion 29, a predetermined level of rigidity is secured for the protrusion 29 with respect to the in-XY-plane direction. A step is provided between the connection portion 21 and the contact portion 26, and the upper surface of the connection portion 26 is lower than the contact surface 27, so that the slider does not come into contact with the connection portion 21.

The connection portion 21 is thinner than the contact portion 26, and further, the connection portion 21 is divided into four by hole portions 28 to be reduced in width, so that it is reduced in rigidity in the Z-direction to be endowed with a predetermined level of resiliency. In the case where the predetermined level of resiliency can be obtained solely through a reduction in thickness, there is no need for the connection portion 21 to be divided by the hole portions 28.

With this construction, the protrusion 29 exhibits resiliency in the Z-direction, so that it is possible to realize a smooth contact between the vibrator 20 and the slider. Further, if the height of the protrusion 29 is increased for higher speed, the requisite rigidity in the X-direction, which is the driving direction for the slider, is secured for the protrusion 29 due to the side wall portion 24, so that it is possible to transmit the drive force of the vibrator 20 efficiently to the slider.

Further, the protrusion 29 exhibits resiliency at the distal end thereof, so that the resonance frequency in the vibration mode thereof is sufficiently higher than the drive frequency of the vibrator 20, making it possible to obtain a satisfactory actuator performance. Further, in the present exemplary embodiment, the protrusion 29 is of a cylindrical configuration, so that it is possible to further increase the rigidity of the side wall portion 24 as compared with the first exemplary embodiment.

In a vibrator according to a third exemplary embodiment, the thickness of the contact portion is equal to that of the connection portion, and the contact portion is smaller in volume as compared with that in the second exemplary embodiment. FIG. 3A is a perspective view of a vibrator to which the third exemplary embodiment of the present invention is applicable, and FIG. 3B is a perspective view, partly in section, of a protrusion of the vibrator. The actuator of the present exemplary embodiment is also a linear vibration type actuator, and its driving principle is the same as that of the conventional linear vibration type actuator, so that the description thereof will be omitted.

As illustrated in FIG. 3A, a vibrator 30 has a piezoelectric element 35, an elastic member 32 to which the piezoelectric element 35 is fixed, and two protrusions 39 protruding from one end surface of the elastic member 32. As illustrated in FIG. 3B, each protrusion 39 has a cylindrical side wall portion 34, a contact portion 36 having a contact surface 37 to be brought into contact with a slider (not illustrated), and a connection portion 31 connecting the side wall portion 34 and the contact portion 36.

The side wall portion 34 is fixed to the elastic member 32 by laser welding or the like via a fixation portion 33. A step is provided between the connection portion 31 and the contact portion 36, and the upper surface of the connection portion 31 is lower than the contact surface 37, so that the slider does not come into contact with the connection portion 31. The connection portion 31 is divided into four by hole portions 38 to be thereby reduced in width, whereby it is reduced in rigidity in the Z-direction and endowed with a predetermined level of resiliency.

The step between the connection portion 31 and the contact portion 36 is formed by performing drawing on the distal end portion of the protrusion 39. Thus, the contact portion 36 has a thickness equal to that of the connection portion 31, and is reduced in volume as compared with the contact portion 26 of the second exemplary embodiment. Thus, it is possible to further increase the resonance frequency of the vibration mode of the protrusion 29 as compared with that of the second exemplary embodiment.

A vibrator according to a fourth exemplary embodiment of the present invention is a rotary vibration type actuator. A rotary vibration type actuator mainly generates through excitation a progressive wave in a vibrator to generate an elliptic movement in a protrusion of the vibrator. As for the construction and driving principle of the vibrator, a number of examples thereof have been discussed in Japanese Patent Application Laid-Open No. 2006-311790, etc., so a description thereof will be omitted.

Figure 4:
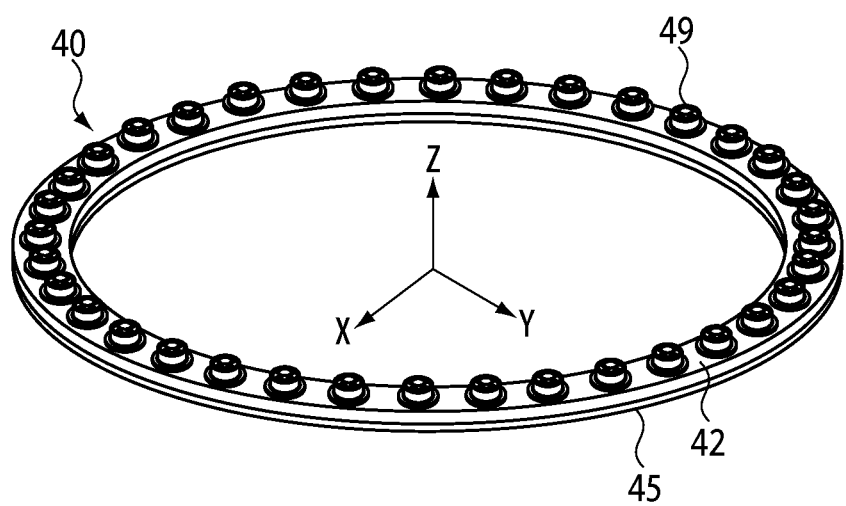
FIG. 4 is a perspective view of a ring-shaped vibrator according to a fourth exemplary embodiment of the present invention.

FIG. 4 is a schematic diagram illustrating a vibrator to which the fourth exemplary embodiment of the present invention is applicable. It is realized by applying the protrusions 29 and 39 illustrated in FIGS. 2A, 2B, 3A, and 3B to the vibrator of a rotary vibration type actuator. As illustrated in FIG. 4, a vibrator 40 has a ring-shaped piezoelectric element 45, an elastic member 42 to which the piezoelectric element 45 is fixed, and a large number of protrusions 49 provided on one end surface of the elastic member 42.

With this construction, the protrusions 49 exhibit resiliency in the Z-direction, making it possible to realize a smooth contact between the vibrator 40 and a rotor (not illustrated) constituting a driven body. Further, if the height of the protrusions 49 is increased for higher speed, it is possible for the protrusions 49 to transmit the drive force of the vibrator 40 efficiently to the rotor.

In a vibrator according to a fifth embodiment of the present invention, the elastic member and the protrusions are formed of the same elastic material. Otherwise, the fifth exemplary embodiment is the same as the second exemplary embodiment, and the driving principle thereof is the same as that of the conventional linear vibration type actuator.

FIG. 5A is a perspective view of a vibrator to which the fifth exemplary embodiment is applicable, and FIG. 5B is a perspective view, partly in section, of a protrusion thereof. As illustrated in FIG. 5A, a vibrator 50 has a piezoelectric element 55, an elastic member 52 to which the piezoelectric element 55 is fixed, and two protrusions 59 provided on one end surface of the elastic member 52.

The elastic member 52 and the protrusions 59 are formed so as to be integrally continuous with each other. As illustrated in FIG. 5B, each protrusion 59 has a cylindrical side wall portion 54, a contact portion 56 having a contact surface 57 to be brought into contact with a slider (not illustrated), and a connection portion 51 connecting the side wall portion 54 and the contact portion 56, with the connection portion 51 being divided into four by hole portions 58.

A step is provided so that the upper surface of the connection portion 51 is lower than the contact surface 57. Thus, the slider does not come into contact with the connection portion 51. The connection portion (thin-walled portions 53) of the elastic member 52 with the protrusions 59 is thinner in the Z-axis direction. In the case where a predetermined level of resiliency can be obtained solely through a reduction in its thickness, there is no need to divide the connection portion 51 into a plurality of parts by the hole portions 58. FIG. 12A is a perspective view of a vibrator illustrating a modification example of the fifth exemplary embodiment of the present invention, and FIG. 12B is a perspective view, partly in section, of a protrusion thereof. As illustrated in FIG. 12A, a vibrator 501 has a piezoelectric element 551, an elastic member 521 to which the piezoelectric element 551 is fixed, and two protrusions 591 provided on one end surface of the elastic member 521. As illustrated in FIG. 12B, each protrusion 591 has a cylindrical side wall portion 541, a contact portion 561 having a contact surface 571 to be brought into contact with a slider (not illustrated), and a connection portion 511 connecting the side wall portion 541 and the contact portion 561. The connection portion (thin-walled portions 531) of the elastic member 521 with the protrusions 591 is thinner in the Z-axis direction. With this configuration, the protrusion 591 can have higher rigidity in-XY-plane direction, so that higher efficiency can be obtained. Further, the resonance frequency of the vibration mode, in which a connection portion 511 provided at a distal end of the protrusion 591 and having resiliency vibrates, becomes higher, thereby enabling unnecessary vibrations to be restrained.

Next, a method of manufacturing the elastic member 52 and the protrusions 59 will be described. FIG. 6 illustrates how press molding is performed on an elastic plate material to shape it into a final configuration. In the following, the steps involved will be described.

Figure 6A:
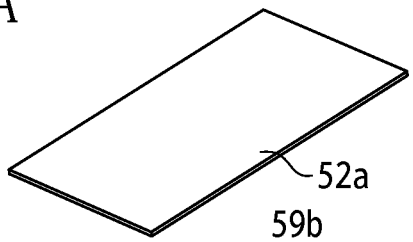
FIGS. 6A to 6F are diagrams illustrating an integral press molding process performed on an elastic member.

In a first step, two hollow protrusions (which later constitute the protrusions of a vibrator) are formed by performing drawing on a metal plate material 52a such as a stainless steel plate illustrated in FIG. 6A, which constitutes the material of the elastic member. In order that the plate material 52a may not be cracked, it is advisable to perform the drawing in a plurality of steps.

Figure 6B:
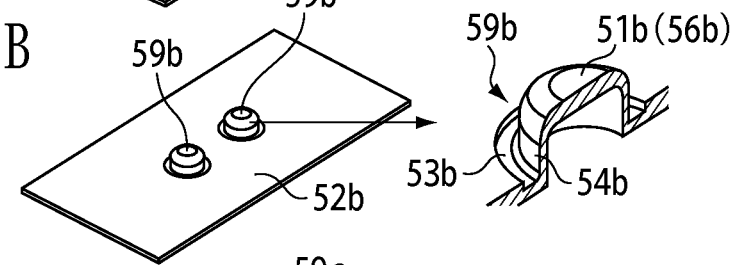

FIG. 6B illustrates a midway step of the drawing operation, in which there are formed protrusions 59b each composed of a continuous cylindrical side wall portion 54b and a distal end portion (51b, 56b) later constituting the connection portion and the contact portion. To provide the protrusions 59b through drawing, the periphery of each side wall portion 54b is squeezed into a thin-walled portion 53b, with the portion of the material corresponding to this reduction in thickness being caused to flow to the side wall portion 54b. Usually, the thickness of the side wall portion 54b is smaller than that of the plate material 52a (52b).

Figure 6C:
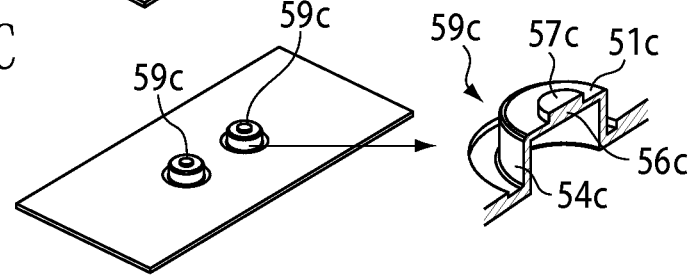

FIG. 6C illustrates the final stage of the drawing process, in which there are formed protrusions 59c each composed of a continuous cylindrical side wall portion 54c, a connection portion 51c, and a contact portion 56c. Along with the drawing, squeezing is performed on the outer peripheral portion of the distal end portion 51b illustrated in FIG. 6B in a direction opposite to the direction in which the protrusion protrudes, whereby there is provided a thin-walled portion (connection portion 51c), forming a step between itself and the contact portion 56c at the center of the distal end portion.

As a result, a slider (not illustrated) to be brought into contact with the contact surface 57c does not come into contact with the connection portion 51c. Further, due to its small thickness, the connection portion 51c exhibits resiliency. As illustrated in FIG. 3B, the step between the contact portion 56c and the connection portion 51c may also be provided by further performing drawing on the distal end portion 51b to cause the central portion of the distal end portion 51b constituting the contact portion to protrude farther than the outer periphery of the distal end portion 51b.

Figure 6D:
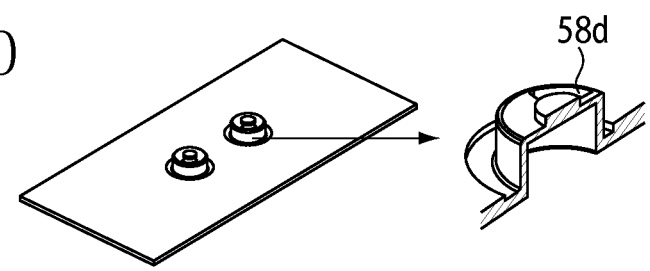
Figure 6E:
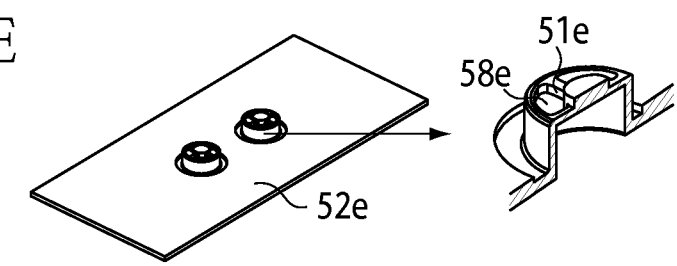

The second step consists of a punching process for endowing the connection portion 51c with a predetermined level of resiliency, and FIGS. 6D and 6E illustrate how the punching is performed. In the present exemplary embodiment, the connection portion is divided into four to reduce the width of the connection portion, so that performing punching at a time may involve cracking or deformation. In view of this, the punching is performed in two stages.

As illustrated in FIG. 6D, punching is performed on two opposing portions of the four portions to form a hole portion 58d. After this, as illustrated in FIG. 6E, punching is performed on the two remaining portions to form a plurality of connection portions 51e having a predetermined level of resiliency due to hole portions 58e. In the case where the predetermined level of resiliency can be attained without having to divide the connection portion, this step is unnecessary.

Figure 6F:
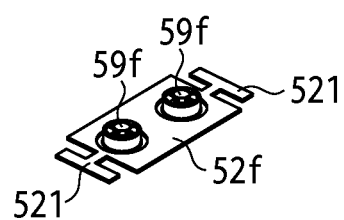

The third and final step is a contour punching step for shaping the elastic member 52e of FIG. 6E into the shape of a vibrator functioning as a vibration type actuator. FIG. 6F illustrates the ultimate shape of the elastic member. As illustrated in FIG. 5A, the elastic member 52f may be shaped into a rectangular elastic member shape in the XY-plane. As illustrated in FIG. 6F, in the case where support portions 521 for fixing the elastic member to a pedestal (not illustrated) are provided on side surfaces of the elastic member, the plate material is punched into a shape consisting of the elastic member and support portions.

In the present exemplary embodiment, the "shape of the vibrator" refers to the shape of the elastic member within the plane (XY-plane) in which the piezoelectric element is joined, or the shape consisting of the elastic member and the support portions within the plane in which the piezoelectric element is joined. As illustrated in FIG. 6F, the support portions 521 are provided at positions where they do not hinder the vibration of the elastic member 52f, for example, at both longitudinal ends of the elastic member, and the shape of the support portions 521 may be one that does not hinder the vibration of the elastic member 52f.

As described above, by the integral presswork illustrated with regard to the first through third steps, there is formed the elastic member 52f, which is integrated with the protrusions 59f. And, by joining the piezoelectric element to the elastic member 52f, the vibrator is formed.

In a vibrator according to a sixth exemplary embodiment, the connection portion reaches not only the distal end of the protrusion but also to the side surface thereof. Otherwise, it is of the same construction as the fifth exemplary embodiment, and its driving principle is the same as that of the conventional linear vibration actuator.

FIG. 7A is a perspective view of a vibrator according to the sixth exemplary embodiment, and FIG. 7B is a perspective view, partly in section, of a protrusion thereof. As illustrated in FIG. 7A, a vibrator 60 has a piezoelectric element 65, an elastic member 62 to which the piezoelectric member 62 is fixed, and two protrusions 69 provided on one end surface of the elastic member 62.

The elastic member 62 and the protrusions 69 are formed integrally and continuously with each other. As illustrated in FIG. 7B, each protrusion 69 is composed of a cylindrical side wall portion 64, a contact portion 66 having a contact surface 67 to be brought into contact with a slider (not illustrated), and a connection portion 61 connecting the side wall portion 64 and the contact portion 66.

A step is provided so that the upper surface of the connection portion 61 is lower than the contact surface 67, thereby preventing the slider from coming into contact with the connection portion 61. The connection portion 61 is reduced in thickness and is divided into a plurality of portions by hole portions 68, whereby it is reduced in rigidity in the Z-direction and is endowed with a predetermined level of resiliency.

In the present exemplary embodiment, the continuous side wall portion 64 is solely formed at the root of the protrusion 69, and the hole portions 68 dividing the connection portion 61 reach not only the distal end of the protrusion but also the side surface thereof. Accordingly, the connection portion 61 exhibits some resiliency not only in the Z-direction but also in the in-XY-plane direction. This is effective in smoothing the contact with the slider in the case where the in-XY-plane component of the vibration of the vibrator 60 is large. Further, at the connection portions (thin-walled portions 63) thereof connected with the protrusions 69, the elastic member 62 is reduced in thickness in the Z-direction.

Figure 8A:
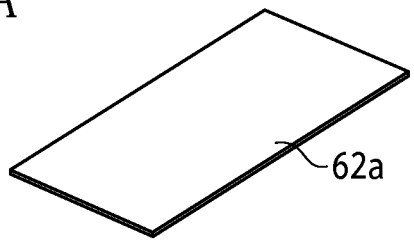
FIGS. 8A to 8E are diagrams illustrating an integral press molding process performed on the elastic member of FIGS. 7A and 7B.
Figure 8B:
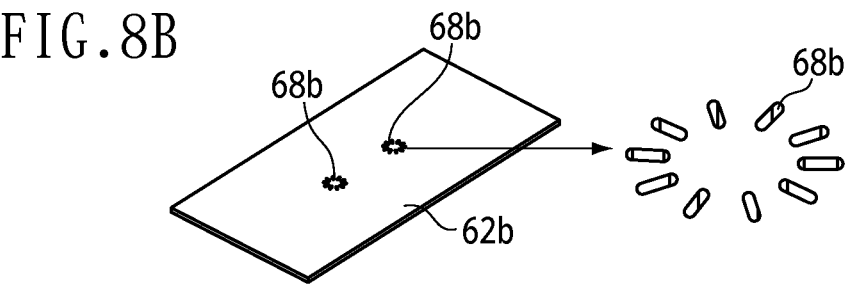

Next, a method of manufacturing the elastic member 62 and the protrusions 69 will be described. FIGS. 8A through 8E illustrate the steps in which press molding is performed on the plate material of the elastic member to shape it into the ultimate shape. In the following, the steps will be described. In the first step, punching is performed on a plate material formed of a metal such as stainless steel constituting the elastic member 62a illustrated in FIG. 8A, whereby there is prepared a plate material 62b having a plurality of hole portions 68b as illustrated in FIG. 8B.

Figure 8C:
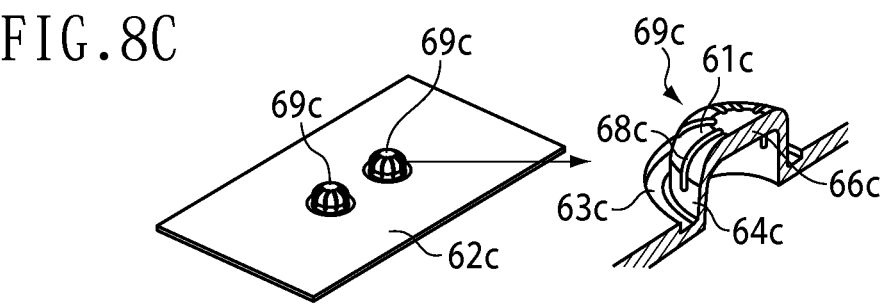

In the second step, drawing is performed on the plate material 62b illustrated in FIG. 8B to thereby form two protrusions (which are to constitute the protrusions of the vibrator). In order that the plate material 62b may not be cracked, the drawing is performed in a plurality of stages. FIG. 8C illustrates a mid stage thereof, in which there are formed cylindrical continuous side wall portions 64c and distal end portions (distal end portion centers 66c and outer peripheral portions 61c of the distal end portions) which later constitute the contact portions and the connection portions.

Each distal end portion outer peripheral portion 61c, which later constitutes a connection portion, is divided into a plurality of portions by hole portions 68c previously formed in the first step. In order to provide protrusions 69c through drawing, the periphery of each side wall portion 64c is squeezed into a thin-walled portion 63c, and the portion of the material corresponding to the reduction in thickness through the squeezing is caused to flow to the side wall portion 64c. Usually, the thickness of the side wall portion 64c is smaller than the thickness of the plate material 62a (62c).

Figure 8D:
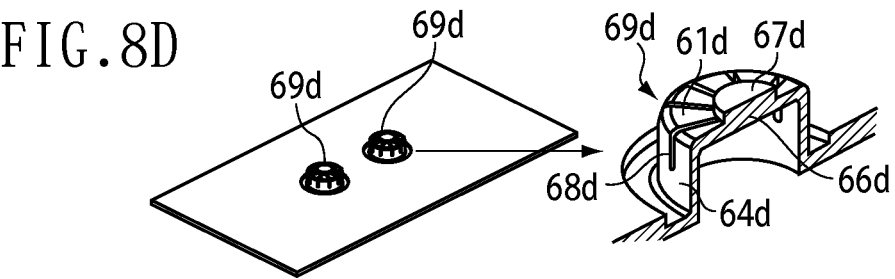

FIG. 8D illustrates the final stage of the drawing. As a result of this drawing, there are formed protrusions 69d each composed of a cylindrical continuous side wall portion 64d, a connection portion 61d divided into a plurality of portions by hole portions 68d, and a contact portion 66d. Along with the drawing, squeezing is performed on the connection portion 61d, whereby its thickness is reduced, by forming a step between the connection portion 61d and the contact portion 66d.

As a result, the contact surface 67d is higher than the upper surface of the connection portion 61d, and the slider (not illustrated) does not come into contact with the connection portion 61d. Further, the connection portion 61d has a small wall thickness and is divided into a plurality of portions, so that it exhibits a predetermined level of resiliency in the Z-direction and, at the same time, since the side surface is also partly divided, it exhibits some resiliency also in the Z-direction. The step between the contact portion 66d and the connection portion 61d may be provided by further performing drawing on the distal ends of the protrusions as illustrated in FIG. 3B.

Figure 8E:
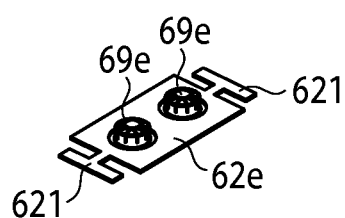

As in the fifth exemplary embodiment, in the third and final step, there is performed contour punching to shape the elastic member 62d illustrated in FIG. 8D into the shape of a vibrator functioning as a vibration type actuator. FIG. 8E illustrates the ultimate shape of the elastic member. As illustrated in FIG. 7A, the elastic member 62e may be formed through punching into the shape of a rectangular elastic member in the XY-plane, and in the case where support portions 621 are provided as illustrated in FIG. 8F, punching is performed on the material into the shape of a vibrator composed of a rectangular elastic member and support portions.

As described above, by the first through third steps of integral presswork, there is formed an elastic member 62e integrated with the protrusions 69e. And, by joining the piezoelectric element to the elastic member 62e, the vibrator is formed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-087891 filed Apr. 6, 2010, which is hereby incorporated by reference herein in its entirety.

What is claimed is:

1. A vibration type actuator comprising:
  a vibrator comprising:
    an elastic member provided with a protrusion; and
    an electrical-mechanical energy conversion element fixed to the elastic member; and
  a driven body configured to be in contact with the protrusion,
  wherein the protrusion includes:
    a contact portion having a contact surface to be in contact with the driven body;
    a side wall portion protruding with respect to a surface of the elastic member and forming a hollow structure; and
    a first connection portion connecting the contact portion and the side wall portion and having flexibility in a direction normal to the contact surface, and
    a second connection portion between the side wall portion and a portion of a elastic member, the portion of the elastic member surrounding the protrusion,
  wherein a thickness of the first connection portion is less than a thickness of the contact portion, and
  wherein a thickness of the second connection portion is thinner than a thickness of the portion of the elastic member.

2. The vibration type actuator according to claim 1, wherein the first connection portion is divided into a plurality of connecting portions.

3. The vibration type actuator according to claim 1, wherein the protrusion is of a cylindrical configuration.

4. The vibration type actuator according to claim 1, wherein the vibrator generates an elliptic movement in the protrusion through synthesis of vibration in a first vibration mode in which the contact surface is displaced in a direction perpendicular to the contact surface, and vibration in a second vibration mode in which the contact surface is displaced in a direction parallel to the contact surface.

5. The vibration type actuator according to claim 1, wherein the vibrator generates an elliptic movement in the protrusion by exciting a progressive wave in the elastic member.

6. A vibrator comprising:
  an electrical-mechanical energy conversion element; and
  an elastic member to which the electrical-mechanical energy conversion element is fixed, wherein the elastic member is provided with a protrusion;
  wherein the protrusion includes:
    a contact portion having a contact surface configured to be in contact with the driven body;
    a side wall portion protruding with respect to a surface of the elastic member and forming a hollow structure; and
    a first connection portion connecting the contact portion and the side wall portion and exhibiting flexibility in a direction normal to the contact surface, and
    a second connection portion between the side wall portion and a portion of the elastic member, the portion of the elastic member surrounding the protrusion,
  wherein a thickness of the first connection portion is less than a thickness of the contact portion, and
  wherein a thickness of the second connection portion is thinner than a thickness of the portion of the elastic member.

7. The vibrator according to claim 6, wherein the first connection portion is divided into a plurality of connecting portions.

8. The vibrator according to claim 6, wherein the protrusion is of a cylindrical shape.

9. The vibration type actuator according to claim 1, wherein the protrusion is of a cylindrical shape.

10. The vibration type actuator according to claim 1, wherein the vibrator is configured to generate an elliptic movement in the protrusion.

11. The vibrator according to claim 6, wherein the vibrator is configured to generate an elliptic movement in the protrusion.

12. A vibration type actuator comprising:
  a vibrator comprising:
    an elastic member provided with a protrusion; and
    an electrical-mechanical energy conversion element fixed to the elastic member; and
  a driven body configured to be in contact with the protrusion,
  wherein the protrusion includes:
    a contact portion having a contact surface to be in contact with the driven body; and
    a side wall portion protruding with respect to a surface of the elastic member and forming a hollow structure,
  wherein the elastic member includes a connection portion connecting the side wall portion and a portion of the elastic member,
  wherein the connection portion is in contact with the electrical-mechanical energy conversion element, and
  wherein a thickness of the connection portion is less than a thickness of a part of the elastic member.

13. The vibration type actuator according to claim 12, wherein the protrusion is of a cylindrical configuration.

14. The vibration type actuator according to claim 12, wherein the vibrator generates an elliptic movement in the protrusion by exciting a progressive wave in the elastic member.

15. The vibration type actuator according to claim 12, wherein the vibrator generates an elliptic movement in the protrusion through synthesis of vibration in a first vibration mode in which the contact surface is displaced in a direction perpendicular to the contact surface, and vibration in a second vibration mode in which the contact surface is displaced in a direction parallel to the contact surface.

16. A vibrator comprising:
an electrical-mechanical energy conversion element; and
an elastic member to which the electrical-mechanical energy conversion element is fixed, wherein the elastic member is provided with a protrusion,
wherein the protrusion includes:
   a contact portion having a contact surface configured to be in contact with the driven body; and
   a side wall portion protruding with respect to a surface of the elastic member and forming a hollow structure,
wherein the elastic member includes a connection portion connecting the side wall portion and a portion of the elastic member,
wherein the connection portion is in contact with the electrical-mechanical energy conversion element, and
wherein a thickness of the connection portion is less than a thickness of a part of the elastic member.

17. The vibrator according to claim 16, wherein the protrusion is of a cylindrical shape.

18. The vibrator according to claim 16, wherein the vibrator generates an elliptic movement in the protrusion by exciting a progressive wave in the elastic member.

19. The vibrator according to claim 16, wherein the vibrator generates an elliptic movement in the protrusion through synthesis of vibration in a first vibration mode in which the contact surface is displaced in a direction perpendicular to the contact surface, and vibration in a second vibration mode in which the contact surface is displaced in a direction parallel to the contact surface.

* * * * *